(No Model.)
J. H. HILL.
CHECKREIN HOOK.
No. 385,115. Patented June 26, 1888.
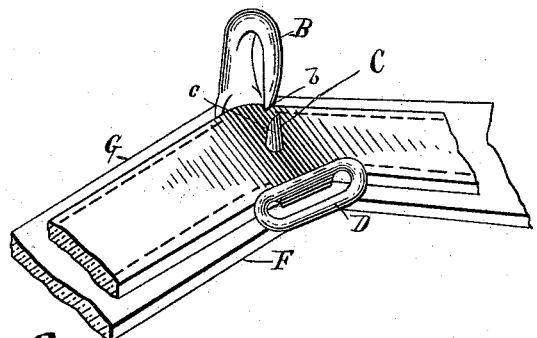
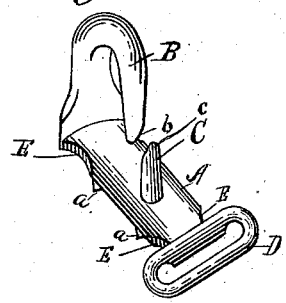
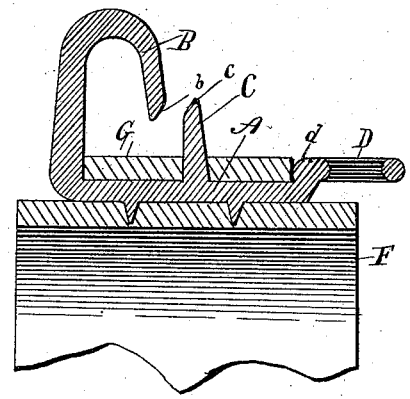
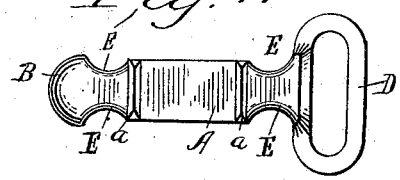
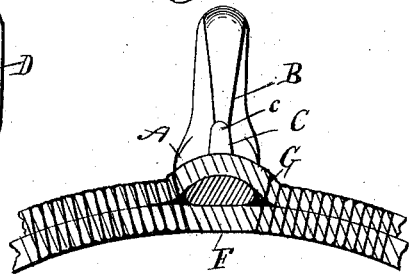
Witnesses.
John S. Finch Jr.
C. O. Davis.
Inventor.
J. H. Hill.
By his Attorney.
C. M. Alexander.

UNITED STATES PATENT OFFICE.

JUSTIN H. HILL, OF CHICAGO, ILLINOIS.

CHECKREIN-HOOK.

SPECIFICATION forming part of Letters Patent No. 385,115, dated June 26, 1888.

Application filed November 3, 1887. Serial No. 254,237. (No model.)

*To all whom it may concern:*

Be it known that I, JUSTIN H. HILL, a citizen of the United States, residing at Chicago, in the county of Cook and State of Illinois, have invented certain new and useful Improvements in Checkrein-Hooks, of which the following is a specification, reference being had therein to the accompanying drawings.

My invention has relation to certain new and useful improvements in checkrein-hooks of that class which are usually attached to harness saddles or pads; and it consists in certain novel features of construction whereby I am enabled to produce a cheap, durable, and very strong device that may be easily and securely applied to the saddle-straps, and when so applied will not be liable to cut the stitching or threads that hold it in place, as will be more fully hereinafter specified, and particularly pointed out in the claims appended.

Referring to the drawings annexed, Figure 1 represents a perspective view of my improved hook applied to the straps of a harness-pad; Fig. 2, a similar view of the hook detached; Fig. 3, a longitudinal sectional view of the hook applied as in Fig. 1; Fig. 4, a bottom view of the hook; and Fig. 5, a transverse sectional view of the hook, showing the manner of stitching it between the straps.

Referring to the drawings by letter, A designates the base or main plate of the hook, which has formed integrally upon its forward end the upwardly-extending main hook B, which is bent backward and downward with respect to the base-plate, and terminates a short distance above the same in a beveled end, *b*. Formed integrally with the base-plate, and extending up vertically from the face of the same, is a spur or auxiliary hook, C, which is situated in line with and a little to the rear of the end *b* of the main hook, and terminates in a beveled or rounded end, *c*, a short distance above the same, forming an inclined throat or narrow passage for the checkrein. By thus terminating the main hook B a short distance below the auxiliary hook C, and beveling its end only on the rear side at *b*, all possibility of the checkrein becoming accidentally unhooked is avoided, while at the same time the rein may be easily inserted and disengaged by hand.

Formed on the rear end of the base-plate is a loop, D, for the back-strap, the loop being slightly raised from the base-plate, so as to form an abutting shoulder, *d*. Formed integrally with the base-plate, and extending transversely of its lower side or face, are two retaining-ribs, *a a*, which are suitably beveled or sharpened, as shown.

On each side of the base-plate (one near each end) are two notches or kerfs, E, which are so situated that they will be in line with the two lines of stitching of the pad-straps when the hook is applied. The hook is securely held between the pad-strap F and the top or covering strap, G, the latter being perforated for the passage of the auxiliary hook C and fitted snugly between the hook B on the forward end and the shoulder *d* upon the rear end of the base-plate, as shown in Fig. 3. The pad-strap F is provided with two longitudinal slits or indentations, in which the ribs *a* are forced, whereby the hook is held securely against any lateral or endwise strain brought to bear on it.

The two lines of stitching which secure the two straps together, the base-plate of the hook being between them, are in line with the notches E, whose edges are preferably rounded and continue up close to the base-plate on each side, the notches or kerfs being designed to prevent the base-plate from cutting the stitching, particularly when the hook becomes a little loose after considerable use, it being evident that were the edges of the plate permitted to touch the stitching, as would be the case if the notches were not provided, they would quickly wear out from contact with the plate. By this means I am enabled to carry the lines of stitching closer to the base-plate of the hook, and thereby more securely clamp the same between the straps. It will be also observed that by providing the bottom of the base-plate with the broad transverse ribs and sinking and holding such ribs into the leather I prevent the checkrein or back-strap from pulling the hook from its seat, and I also prevent any undue lateral or sidewise movement.

I produce by my invention an extremely practical and durable hook, which may by its simplicity of construction be very cheaply cast in one piece and readily and permanently applied to the pad.

Having thus fully described my invention, what I claim as new, and desire to secure by Letters Patent, is—

1. As an improved article of manufacture, a checkrein-hook for harness-pads, consisting of the base-plate A, the main hook B, formed on one end of the said base-plate, the auxiliary hook or spur C, formed upon the face of the base-plate in close proximity to the end of the hook B, the loop D, formed on the rear end of the base-plate and slightly raised above the same, forming the shoulder d, and the transverse ribs a, formed integral with the base-plate and extending entirely across the lower side thereof, the said base-plate being provided with the notches E in its edges, all arranged as and for the purposes described.

2. A checkrein-hook consisting of a base-plate, A, having formed in its opposite longitudinal edges the notches E, for the purpose described, and the main and auxiliary hooks formed integrally with the said base-plate, substantially as and for the purpose described.

3. A checkrein-hook consisting of the base-plate A, having formed integrally with it the main hook B, the back-strap loop D, formed on the rear end of the base-plate, and the ribs a, formed integrally with the said base-plate and extending entirely across its lower side, all substantially as described.

In testimony whereof I affix my signature in presence of two witnesses.

JUSTIN H. HILL.

Witnesses:
H. S. MECARTNEY,
R. H. TOWNE.